United States Patent [19]
Jantzen

[11] Patent Number: 6,116,679
[45] Date of Patent: Sep. 12, 2000

[54] CURTAIN SIDE TRUCK BODY AND/OR TRAILER SIDE RAIL-TO-POST CONNECTION

[76] Inventor: Steven L. Jantzen, 107 Krause Dr., Jerrseyville, Ill. 62052

[21] Appl. No.: 08/996,229

[22] Filed: Dec. 22, 1997

[51] Int. Cl.[7] .......................................................... B60J 5/06
[52] U.S. Cl. ................................ 296/181; 296/29; 296/30
[58] Field of Search .............................. 296/29, 30, 183, 296/181, 138

[56] References Cited

U.S. PATENT DOCUMENTS

| | | | |
|---|---|---|---|
| 3,224,805 | 12/1965 | Clyatt | 296/10 |
| 3,709,552 | 1/1973 | Broadbent | 296/138 |
| 4,462,629 | 7/1984 | Todori et al. | 296/30 |
| 4,595,231 | 6/1986 | Bennett et al. | 296/181 |
| 4,826,236 | 5/1989 | Bennett | 296/181 |

FOREIGN PATENT DOCUMENTS

| | | | |
|---|---|---|---|
| 2156748 | 3/1985 | United Kingdom | 296/181 |

Primary Examiner—D. Glenn Dayoan
Assistant Examiner—Lori L. Coletta
Attorney, Agent, or Firm—Henry W. Cummings

[57] ABSTRACT

In accordance with the present invention a pin connection is applied between the side rail and the vertical post to reduce or eliminate the large lading load moment. In one embodiment the pin connection may comprise a first plate integrally connected by welding or rugged mechanical fasteners to the side rail at one end. A second plate is integrally connected by welding or rugged mechanical fasteners to the vertical post. The first and second plates are transversely spaced and abut. Rugged transversely extending mechanical fasteners, such as a shoulder bolt, extend between the plates. The fastening means can be tightened to a desired torque, of for example 50 to 100 foot pounds. The fastening means are provided to reduce or eliminate the lading load moment. The roof load applied to the corner posts is taken in transversely extending end and front skirts, which also support the truck body.

20 Claims, 6 Drawing Sheets

CURTAIN SIDE TRUCK BODY AND/OR TRAILER SIDE RAIL-TO-POST CONNECTION

I FIELD OF INVENTION

This invention relates to curtain side truck bodies and truck trailers. It specifically relates to a side rail-to-vertical post connection to relieve a moment caused by a heavy floor load.

II BACKGROUND OF THE INVENTION

This invention relates to so called "curtain side" truck bodies and truck trailers for side loading and unloading, for example as described in U.S. Pat. No. 3,709,552.

In this type of trailer construction the side walls normally used as load carrying members are dispensed with so that the lading may be loaded and unloaded from the sides of the truck body.

A curtain is used to protect the lading from rain, and to some degree other environmental factors.

However, when certain heavy loads are carried, the load tends to cause the side rails and connecting transverse members to deflect in an arcuate concave pattern, which in turn applies a large floor load moment to the four vertical posts which support the top rails, and the roof.

In some cases this lading moment applied to the vertical posts has been sufficient to cause cracks or loose bolts in the area of the side rail and vertical post juncture.

In U.S. Pat. No. 4,595,231, rigid, semi-rigid, fully flexible, and pivotable joints are disclosed to overcome the problem of trucks and trailers having the rectangular frame subjected to deflection and longitudinal twisting in service under load. However, none of the joints described or illustrated in the Patent are directed to the problem of the lading load moment in the side rails applied to the vertical vertical posts in the front wall or the end wall of the truck or trailer.

III SUMMARY OF THE INVENTION

A. OBJECT

The object of the present invention is to reduce or eliminate the structural distress caused by heavy lading loads in the side rails which in turn are applied to the vertical corner posts.

B. SUMMARY

In accordance with the present invention a pin connection is applied between the side rail and the vertical post to reduce or eliminate the large lading load moment. In one embodiment the pin connection may comprise a first plate integrally connected by welding or rugged mechanical fasteners to the side rail at one end. A second plate is integrally connected by welding or rugged mechanical fasteners to the vertical post. The first and second plates are transversely spaced and abut. Rugged transversely extending mechanical fasteners, such as a shoulder bolt, extend between the plates. The fastening means can be tightened to a desired torque, of for example 50 to 100 foot pounds. The fastening means are provided to reduce or eliminate the lading load moment. The roof load applied to the corner posts is taken in transversely extending end and front skirts, which also support the truck body.

IV THE DRAWINGS

V DESCRIPTION OF PREFERRED EMBODIMENTS

Figure 1:
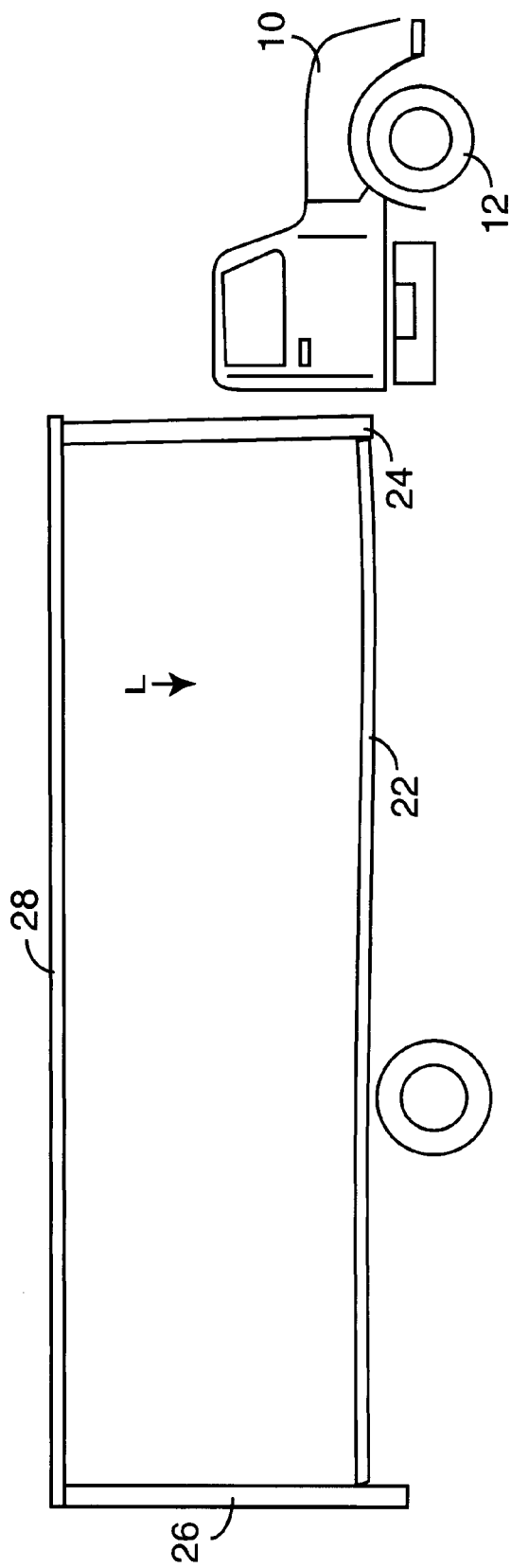
FIG. 1 is a side elevation view of a cab and curtain side truck body.
Figure 2:
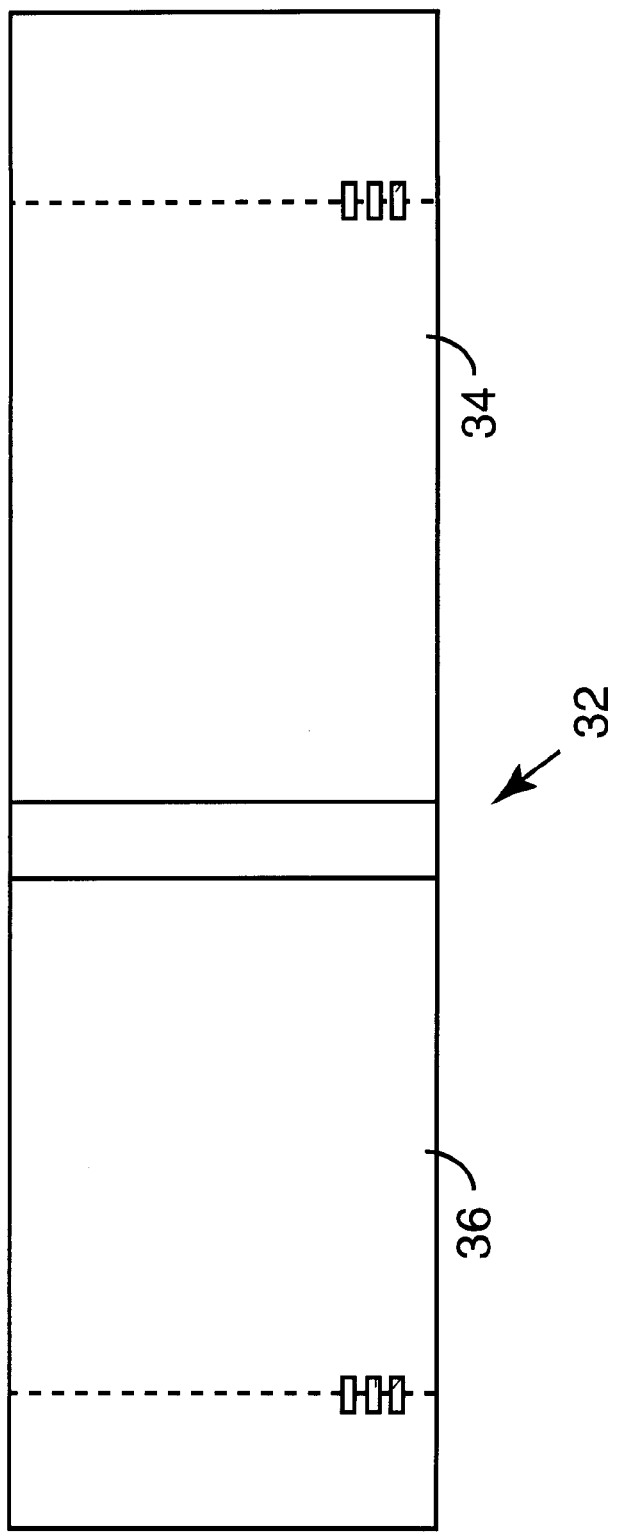
FIG. 2 is a bottom view of FIG. 1.

FIG. 1–4 illustrate a cab 10 having an engine (not shown) and wheels 12.

Cab 10 pulls a curtain side truck body or truck trailer 20 having laterally spaced longitudinally extending side rails 22, 23; laterally spaced vertically extending front corner posts 24, 25; laterally spaced vertically extending rear corner posts 26, 27; longitudinally extending top chords 28 and 29, which support a roof 30.

The truck body floor 32 includes a front portion 34 having transversely extending floor panel supports and a rear section having additional transversely extending floor panel supports 36 extending between front skirt 37 and rear skirt 38.

Figure 3:
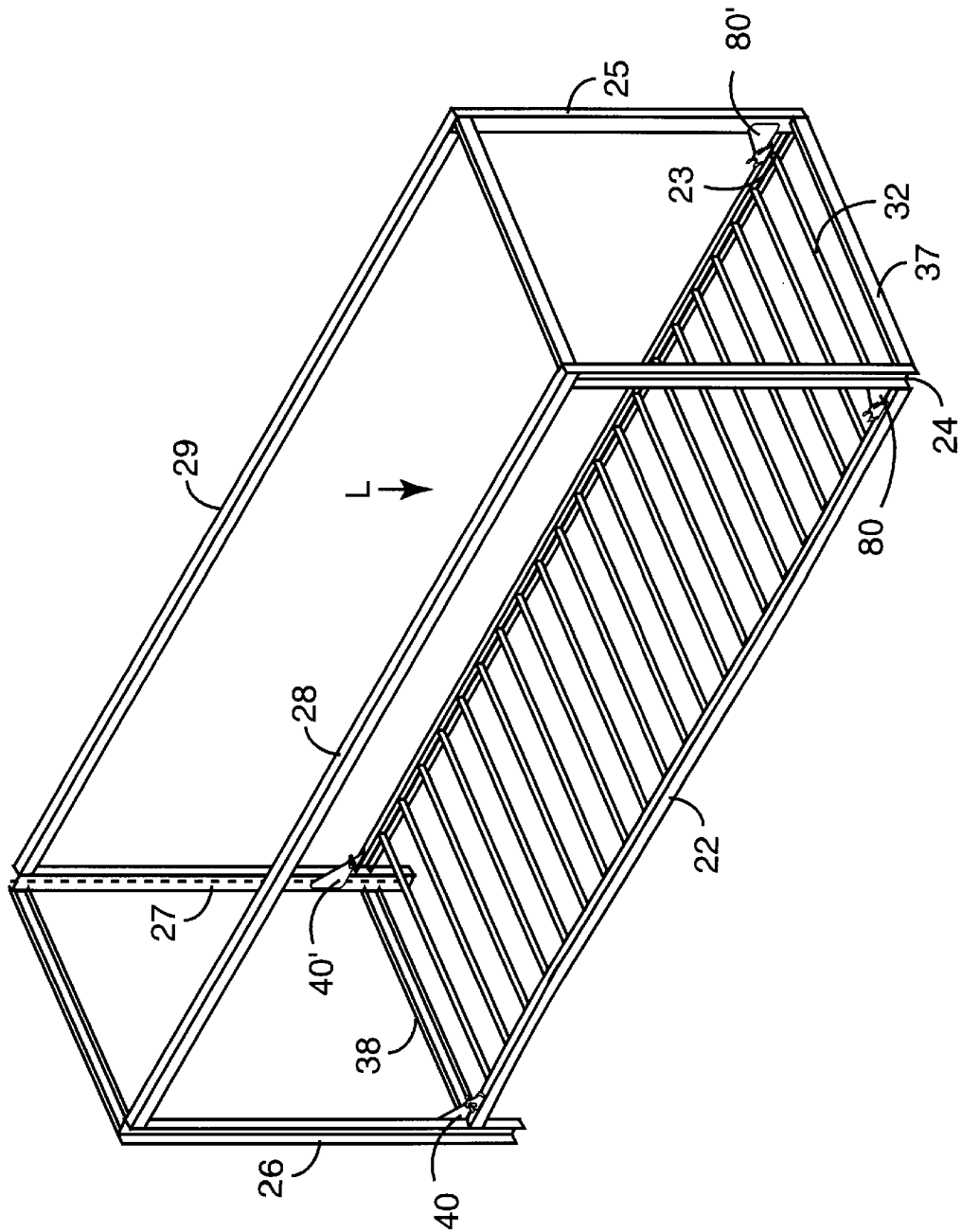
FIG. 3 is a perspective view of the truck body with a computer simulated heavy load.
Figure 4:
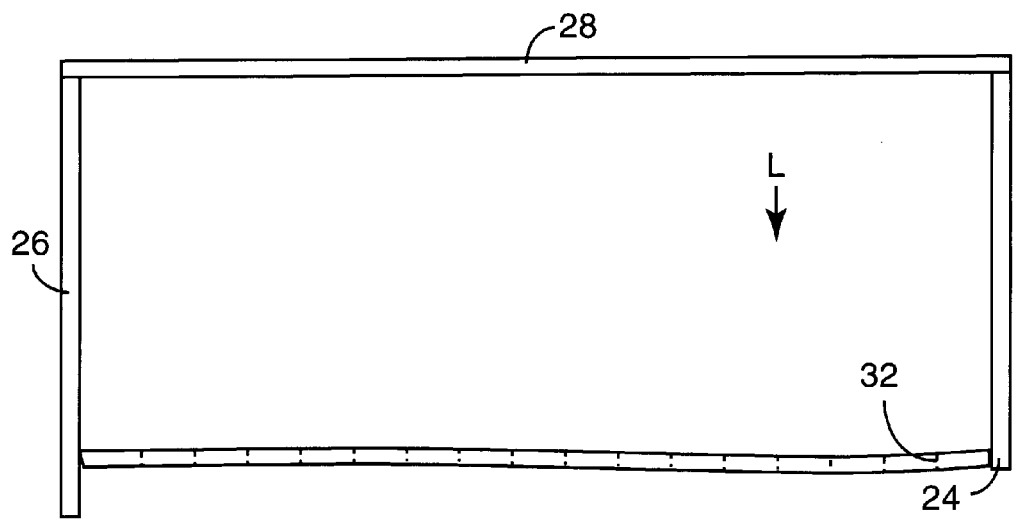
FIG. 4 is a side elevation view of the truck body with a computer simulated load.
Figure 4A:
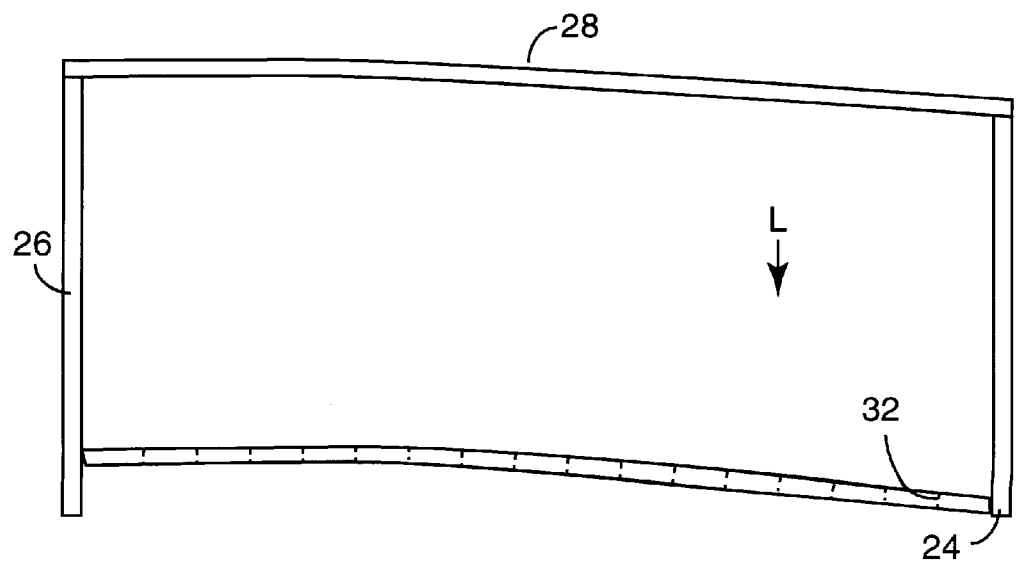
FIG. 4A is a side elevation view of truck body after the load is applied to the floor.

FIGS. 3 and 4 represent computer simulations of a large lading load L applied to the truck body floor 32, causing the side rails 22 to deflect.

Figure 5:
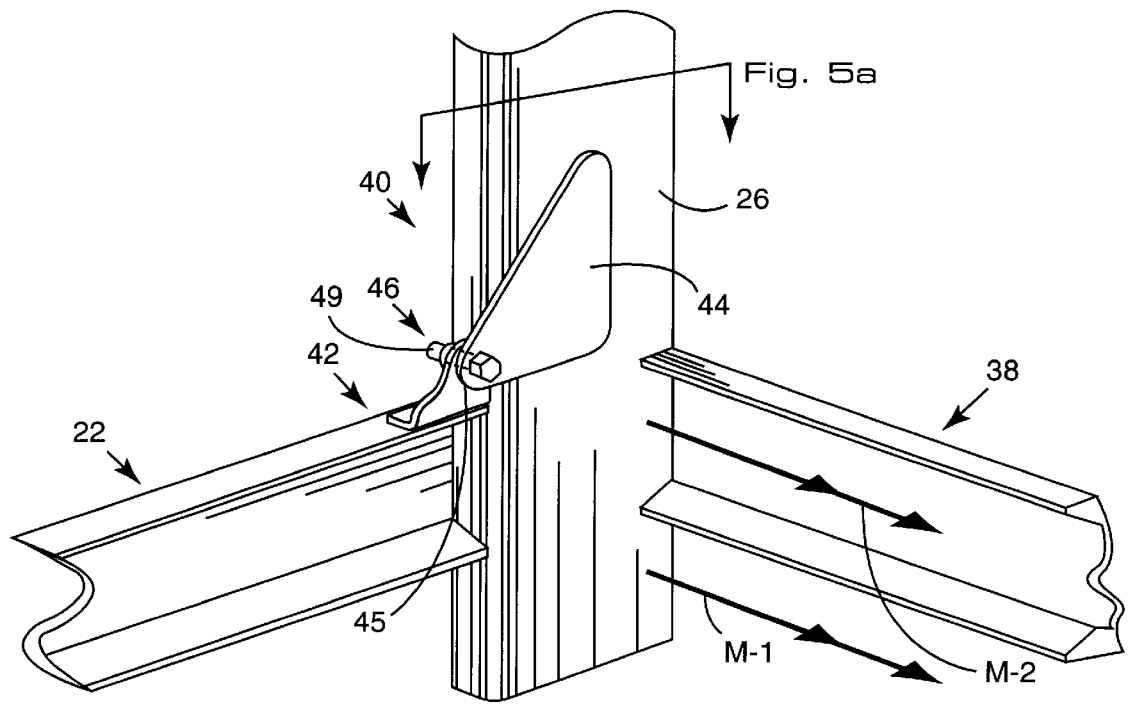
FIG. 5 is a schematic perspective view of one embodiement of the pin connection of the present invention.
Figure 5A:
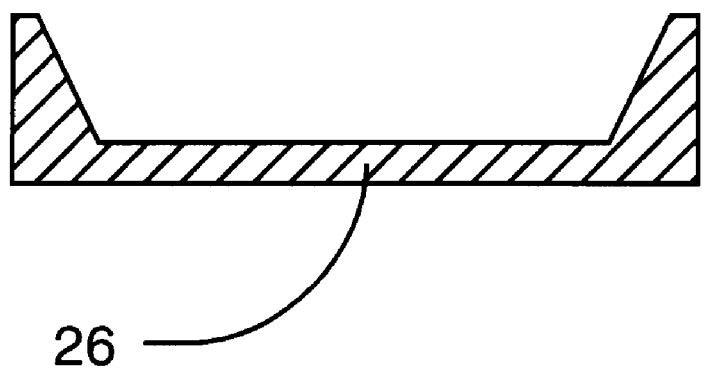
FIG. 5A is a sectional view looking in the direction of the arrows along the line 5A—5A in FIG. 5.

As shown in FIG. 5, the deflection load in the side rails 22 and 23 causes a large lading load M-1 to be applied to front skirt 37 and rear skirt 38.

There also is a large moment M-2 caused by the roof tending to bend corner posts 24, 25, 26 and 27 from time to time.

The combination of the lading load moment M-1 and the roof moment M-2, when the lading load is large has tended to and has caused cracks and loose bolt connections in the side rail-to-corner post connections.

In accordance with the present invention in order to reduce or eliminate the lading load moment M-1 a pin connection 40 is provided as illustrated in FIG. 5.

In one embodiment the pin connection 40 may comprise a first plate 42 integrally connected by welding or rugged mechanical fasteners to the side rail 22 at one end. A second plate 44 is integrally connected by welding or rugged mechanical fasteners to the vertical post 26. The first and second plates 42 and 44 are transversely spaced and abut at 45. Rugged transversely extending mechanical fastening means 46, for example one or more heavy duty bolts 48 and fastening nuts 49, for example, a shoulder bolt and nut extend between the plates. The fastening means can be tightened to a desired torque, of for example 50 to 100 foot pounds. The fastening means are provided to greatly reduce or eliminate the lading load Moment M-1 and react the lading vertical shear load. The moment M-1 which is large for a rigid connection becomes small or non-existent due to the pin connection. Preferably the roof load moment M-2 applied to the corner posts 24, 25, 26, and 27 is taken in the transversely extending end skirt 38 and front skirt 37.

The side rails and corner posts need not necessarily be channels, but may be angles, or other known load bearing construction shape. The preferred mechanical fasteners may be shoulder bolts and nuts, or other plain pin connections with any known pin retention fasteners. However, fasteners such as Huck bolts that must be installed tightly, and will therefore transmit torque about the axis of the bolt should be avoided.

Rugged mechanical fasteners may also be used to connect the plates to the side rails and the corner posts, instead of welding to enable them to be removed.

In general the pin connection 40 is applied to both rear side sill to corner post junctures 22, 26, and 23, 37, 40, 40' and preferable to the front junctures 22, 24 and 23, 35, 80, 80'. Although for some applications, depending on the lading load, side rail and corner post construction, the pin connection may be appied to one or more of the junctures.

What is claimed is:

1. A curtain side truck body having;
    laterally spaced longitudinally extending side rails;
    laterally spaced vertically extending front corner posts integrally connected to a front end of said side rails;
    laterally spaced vertically extending rear corner posts integrally connected to a rear end of said side rails;
    longitudinally extending top chords integrally connected to a top portion of said corner posts;
    said top chords integrally connected to and supporting a roof extending therebetween;
    a truck floor extending between a front skirt integrally connected to said floor and said front corner posts, and a rear skirt, integrally connected to said floor and said rear corner posts, wherein a roof load moment applied to said corner posts is taken in said transversely extending end skirt and said front skirt, the improvement comprising: wherein a lading load in the truck body acts on the truck floor and the side rails mechanical fastening means extending between at least one of said side rails and corner posts for reducing or eliminating a lading load moment applied to at least one of said side rails.

2. The improvement according 1 wherein said mechanical fastening means comprise a pin connection.

3. The improvement according 2 wherein said pin connection is applied to both rear side rail-to-corner post junctures.

4. The improvement according 3 wherein said pin connection is applied to the front side rail-to-corner post junctures.

5. The improvement according 3 wherein said pin connection is applied to only one juncture.

6. The improvement according to claim 1 wherein said mechanical fastening means may be tightened to a torque of 50 to 100 foot pounds.

7. The improvement according 2 wherein said pin connection comprises:
    a first plate integrally connected to a side rail at one end;
    a second plate integrally connected to a post;
    said first and second plates being transversely spaced; and
    transversely extending mechanical fastening means extending between said plates.

8. The improvement according 7 wherein said pin connection is applied to both said rear side rail-to-corner post junctures.

9. The improvement according 8 wherein said pin connection is applied to said front side rail-to-corner post junctures.

10. The improvement according 7 wherein said pin connection is applied to only one juncture.

11. The improvement according 7 wherein said pin connection is applied to three junctures.

12. The improvement according 7 wherein said mechanical fastening means comprise at least one shoulder bolt.

13. The improvement according 12 wherein said side rails comprise channels and said side rails.

14. The improvement according 13 wherein said front skirts and rear skirts comprise channels.

15. A method for improving a curtain side truck body having laterally spaced longitudinally extending side rails;
    laterally spaced vertically extending front corner posts integrally connected to a front end of said side rails;
    laterally spaced vertically extending rear corner posts integrally connected to a rear end of said side rails;
    longitudinally extending top chords integrally connected to a top portion of said corner posts;
    said top chords integrally connected to and supporting a roof extending therebetween;
    a truck floor extending between front skirt integrally connected to said floor and said front corner posts, and
    rear skirt integrally connected to said floor and said rear corner posts, wherein a roof load moment applied to rear corner posts is taken in said transversely extending end skirt and said front skirt, the improvement comprising: wherein a lading load in the truck body acts on the truck floor and the side rails providing mechanical fastening means for reducing or eliminating a lading load moment applied to at least one of said side rails.

16. The method according to claim 15 including providing said mechanical fastening means as a pin connection.

17. The method according to claim 16 including: connecting a first plate integrally to a side rail at one end;
    connecting a second plate integrally to a post;
    locating said first and second plates to be transversely spaced; and
    locating transversely extending mechanical fastening means extending between said plates.

18. The method according to claim 17 including connecting said pin connection to both said rear side rail-to-corner post junctures.

19. The method according to claim 18 including applying said pin connection to said front side rail-to-corner post junctures.

20. The method according to claim 17 including applying at least one shoulder bolt to said pin connection.

* * * * *